US009190105B1

(12) United States Patent
Klimov

(10) Patent No.: US 9,190,105 B1
(45) Date of Patent: Nov. 17, 2015

(54) RADIALLY-COHERENT READING AND WRITING SYSTEM AND METHOD FOR A MAGNETIC DISK

(71) Applicant: Guzik Technical Enterprises, Mountain View, CA (US)

(72) Inventor: Vladislav Klimov, San Jose, CA (US)

(73) Assignee: GUZIK TECHNICAL ENTERPRISES, Mountain View, CA (US)

( * ) Notice: Subject to any disclaimer, the term of this patent is extended or adjusted under 35 U.S.C. 154(b) by 0 days.

(21) Appl. No.: 14/716,390

(22) Filed: May 19, 2015

Related U.S. Application Data

(60) Provisional application No. 62/001,842, filed on May 22, 2014.

(51) Int. Cl.
*G11B 5/596* (2006.01)
*G11B 20/10* (2006.01)
*G11B 20/12* (2006.01)
*G11B 27/32* (2006.01)

(52) U.S. Cl.
CPC ...... *G11B 20/10259* (2013.01); *G11B 20/1252* (2013.01); *G11B 27/322* (2013.01); *G11B 2020/1287* (2013.01)

(58) Field of Classification Search
CPC ...... G11B 5/82; G11B 5/746; G11B 5/59688; G11B 5/59633; G11B 5/59655; G11B 5/865; G11B 20/1252; G11B 2020/322; G11B 2020/1252
USPC .................. 360/77.08, 135, 55, 49, 51, 78.08, 360/78.14, 77.07
See application file for complete search history.

(56) References Cited

U.S. PATENT DOCUMENTS

| 7,688,539 B1 | 3/2010 | Bryant et al. |
| 2012/0087036 A1* | 4/2012 | Hirano .................. B82Y 10/00 360/77.04 |
| 2013/0010384 A1 | 1/2013 | Nonaka et al. |
| 2013/0010385 A1 | 1/2013 | Nonaka et al. |
| 2013/0033783 A1 | 2/2013 | Gerasimov et al. |

FOREIGN PATENT DOCUMENTS

| CA | 2134494 C | 6/1995 |
| EP | 0353274 B1 | 2/1990 |
| EP | 1096491 A1 | 5/2001 |
| EP | 2390880 A2 | 11/2011 |
| WO | 8501402 A1 | 3/1985 |
| WO | 9960566 A1 | 11/1999 |

(Continued)

*Primary Examiner* — Nabil Hindi
(74) *Attorney, Agent, or Firm* — Burns & Levinson LLP; Joseph M. Maraia

(57) ABSTRACT

Radially-coherent data reading from, and data writing to, a magnetic disk use non-coherently written synchronization signals on the disk. In a form, the radially-coherent data reading and writing is performed using a magnetic head/disk tester which includes a spinstand for supporting a spinning magnetic disk, a magnetic head assembly, a write channel network for generating a write data signal for application to a write element of the magnetic head, a read channel for receiving a read-back signal from a read element of the magnetic head assembly, and a signal processing system that analyzes a read-back signal from a disk and provides synchronization signals for radially-coherent data reading and data writing.

16 Claims, 9 Drawing Sheets

Read-Write Analyzer with Synchronizer block diagram

(56) References Cited

FOREIGN PATENT DOCUMENTS

| WO | 9960567 | A1 | 11/1999 |
| WO | 0152260 | A1 | 7/2001 |
| WO | 2008001062 | A1 | 1/2008 |
| WO | 2008142004 | A1 | 11/2008 |

* cited by examiner

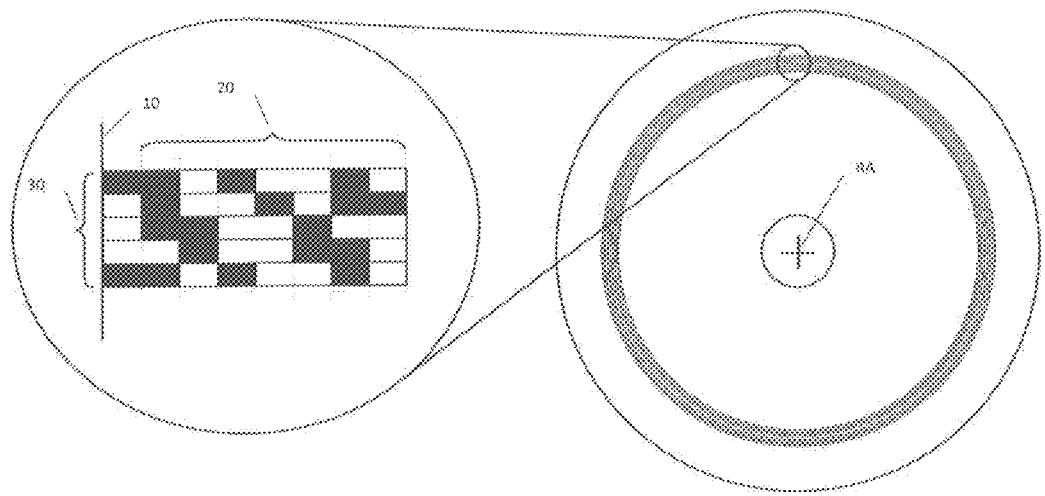
Fig. 1  Data written in radially-coherent manner
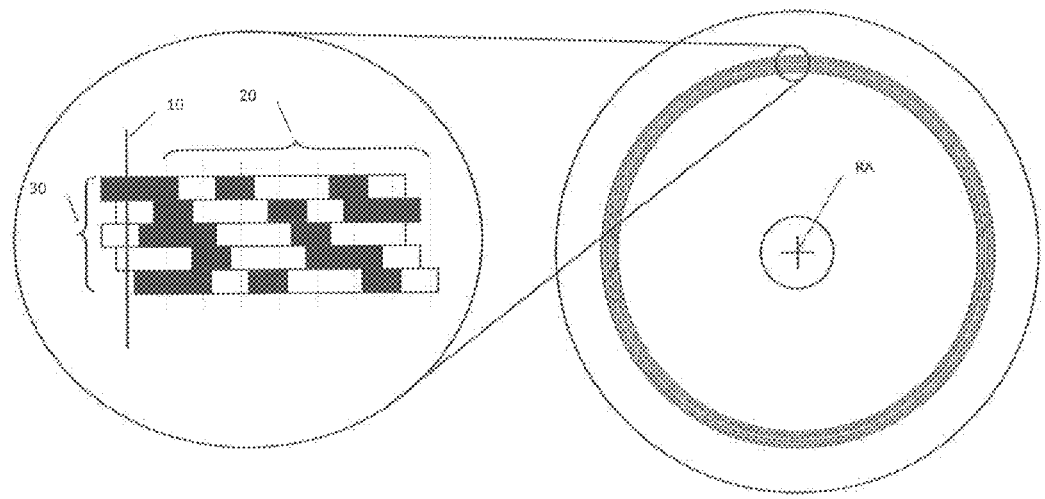
Fig. 2  Data written in non radially-coherent manner

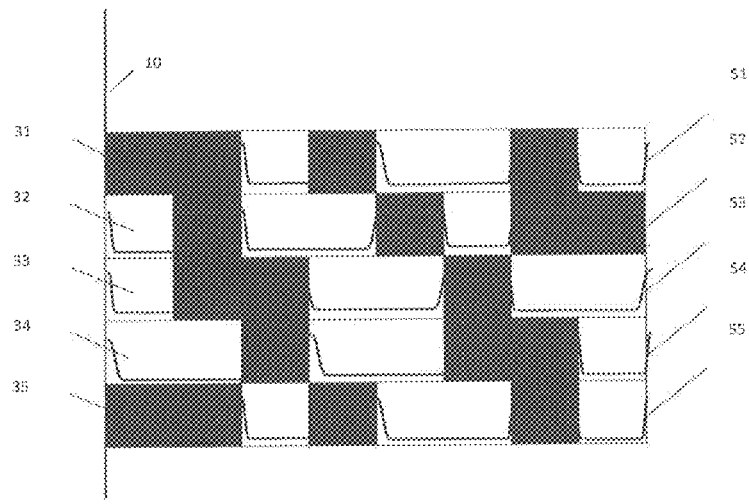
Fig. 3    Data read in radially-coherent manner
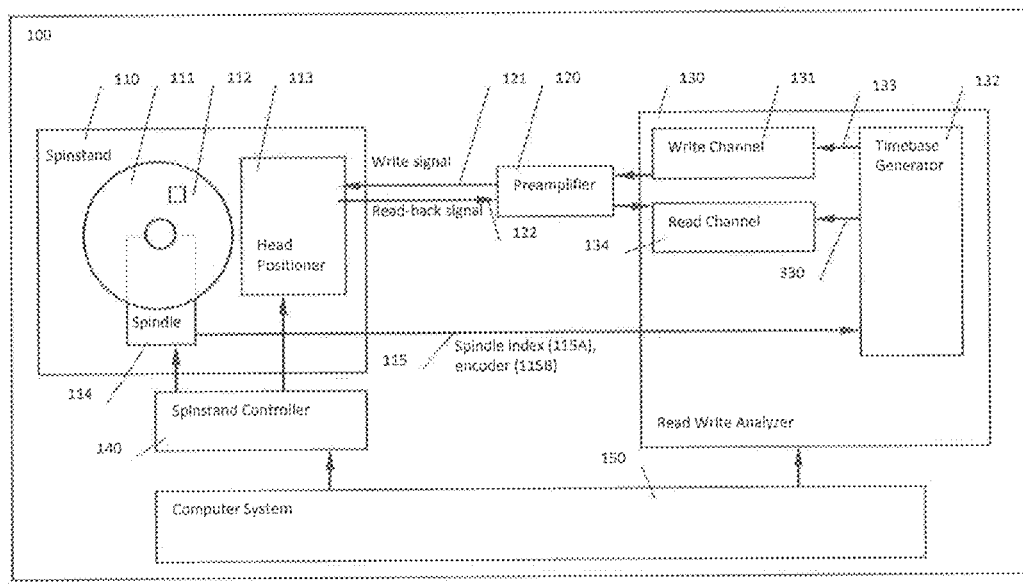
Fig. 4    Prior art Head/Disk Tester block diagram

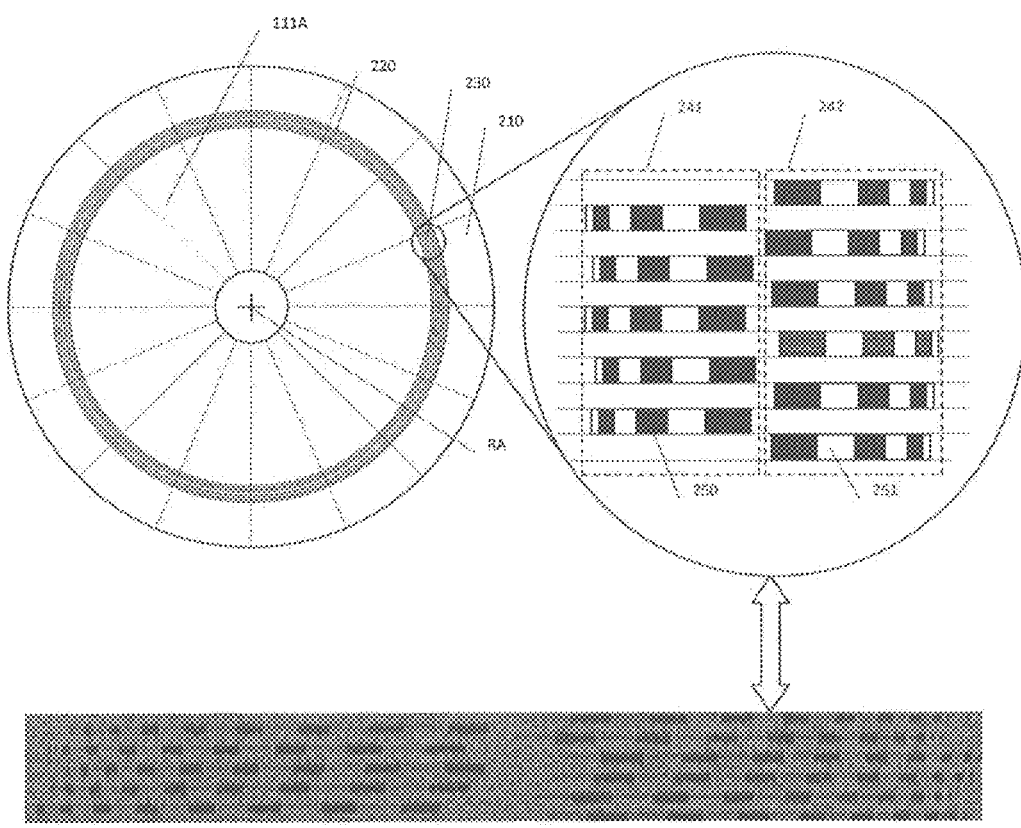
Fig. 5   Synchronization Area Format

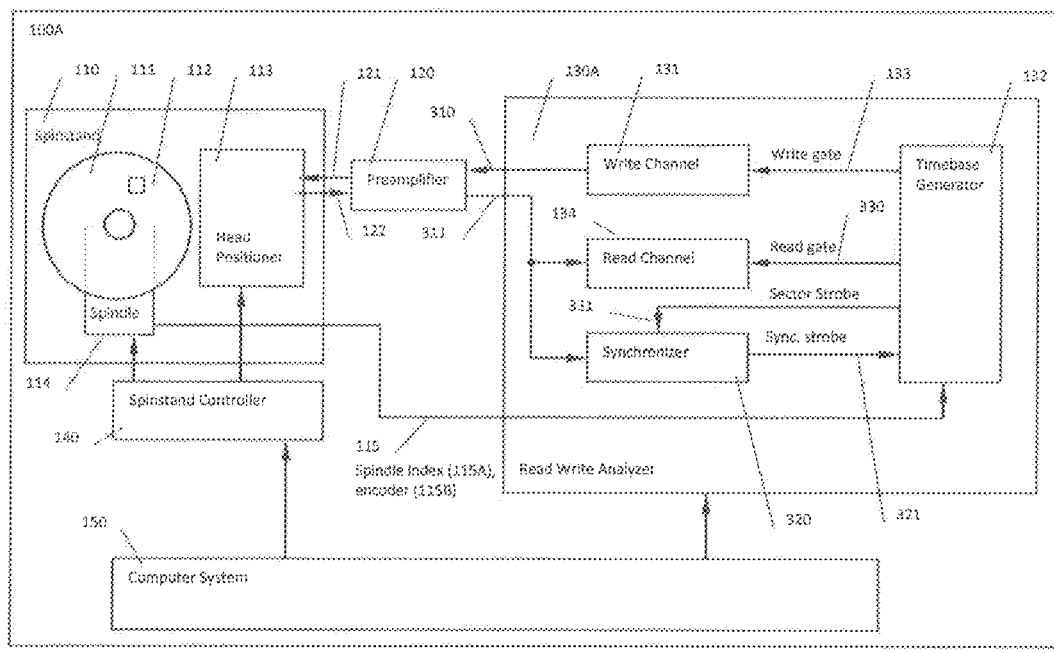
Fig. 6  Read-Write Analyzer with Synchronizer block diagram

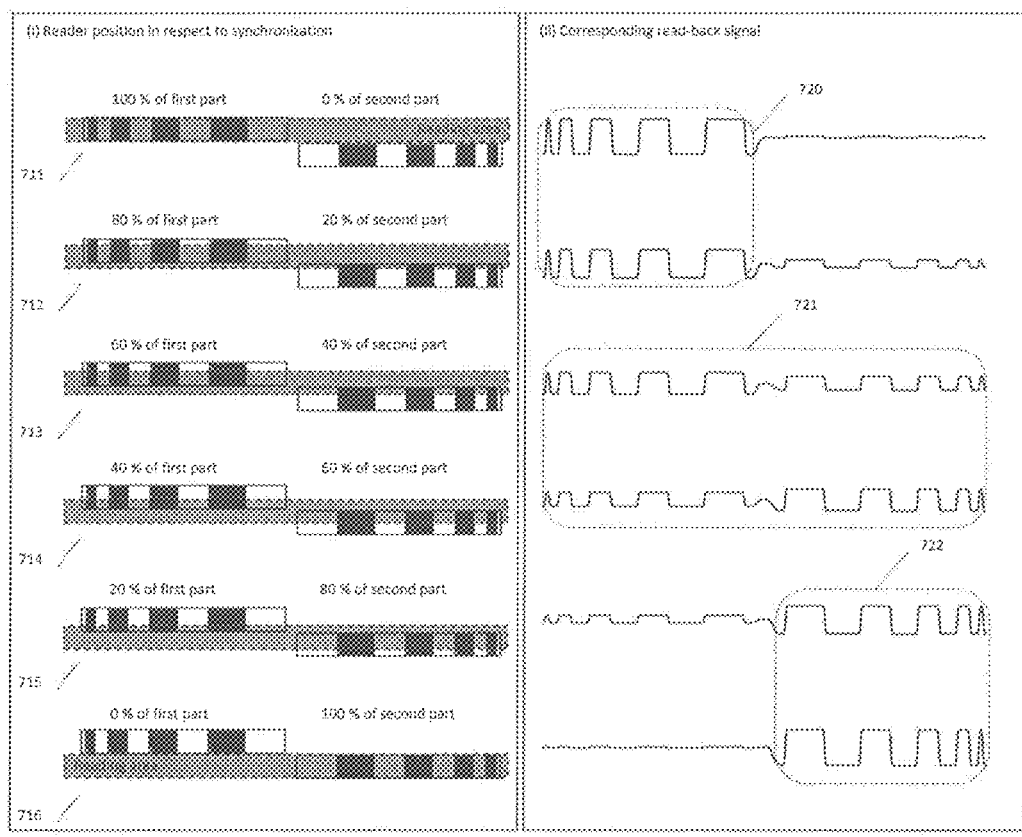
Fig. 7    Read-back signal for different reader positions in respect to synchronization tracks

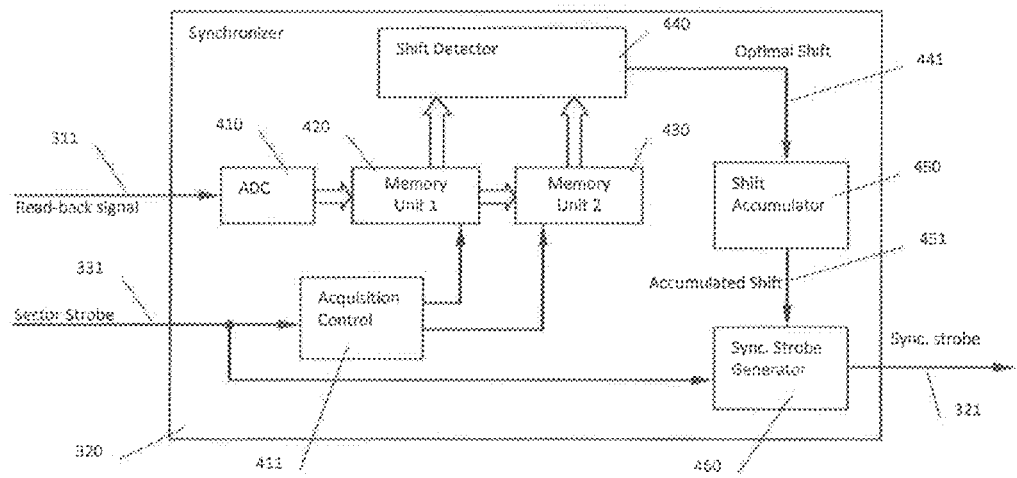
Fig. 8    Synchronizer block diagram
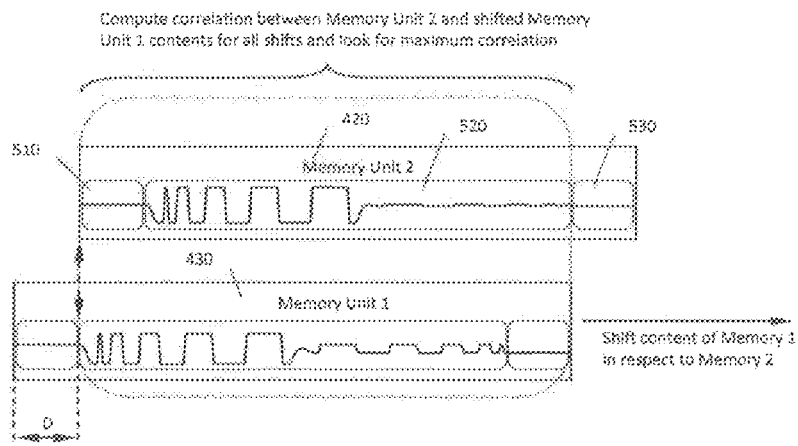
Fig. 9    Computing correlation between signals captured on adjacent radial positions

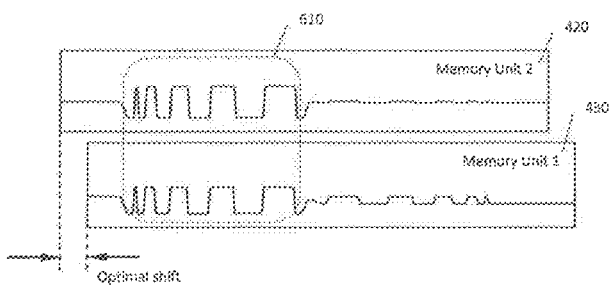
Fig. 10  Optimal shift delivering maximum correlation between signals captured on adjacent radial positions

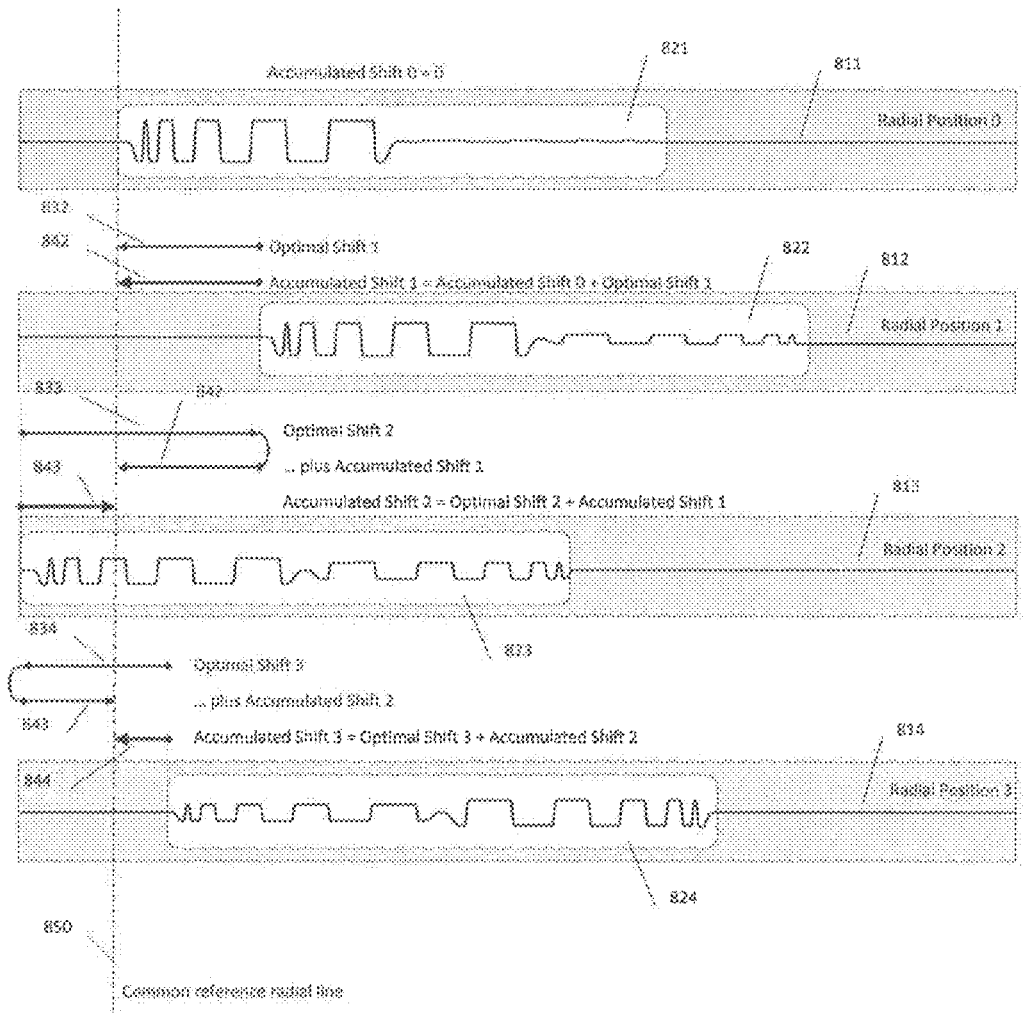
Fig. 11   Accumulated Shift calculation

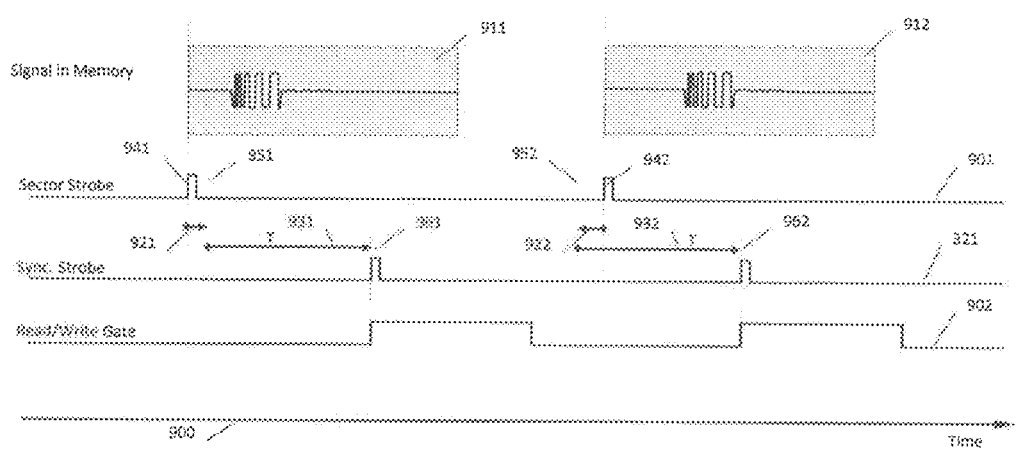
Fig. 12   Synchronization Strobe generation

RADIALLY-COHERENT READING AND WRITING SYSTEM AND METHOD FOR A MAGNETIC DISK

RELATED APPLICATION(S)

This application claims the benefit of U.S. Provisional Application No. 62/001,842, entitled "Radially-Coherent Reading and Writing System and Method for a Magnetic Disk," filed May 22, 2014. The entire teachings of the above application(s) are incorporated herein by reference.

FIELD OF INVENTION

The present technology relates generally to magnetic head/disk testers, and more particularly to systems and methods for radially-coherent reading from, and writing, to a magnetic disk.

BACKGROUND

Radially-Coherent Writing

It is common in the art that data be written to a plurality of concentric (about a rotation axis RA of a magnetic disk) circular data tracks on a magnetic disk. The written data is "radially-coherent" in a range of radial positions along the respective data tracks if for each radial position in that range, the bits of the written data start from the same (or a "common") radially-extending reference line on the magnetic disk, and all magnetic transitions along the respective data tracks are aligned with one of a set of uniformly spaced-apart (by a bit period) radially-extending inter-bit boundary lines.

FIG. 1 and FIG. 2 illustrate radially-coherent writing on a magnetic disk and non-radially-coherent writing on a magnetic disk, respectively.

FIG. 1 shows a small area of an exemplary magnetic disk 111 after radially-coherent writing has been performed along five mutually adjacent data tracks 30. In FIG. 1, the horizontal direction represents a circumferentially-extending direction along the circular data tracks, and the vertical direction represents a direction along a radius of the circular data tracks. The data writing at each track 30 always starts from the same radially-extending reference line 10. The dashed vertical lines 20 in FIG. 1 depict the regularly spaced bit boundary lines to which the magnetic transitions are aligned. The positive polarity of media magnetization is shown in black, while negative polarity is shown in white.

FIG. 2 shows a small area of the magnetic disk after non-radially-coherent writing has been performed along the same five mutually adjacent data tracks 30. In FIG. 2, the writing at various radial positions 30 does not start from a common radially-extending line, like line 10, and the magnetic transitions are not aligned with radially-extending inter-bit boundary lines 20 which are at points regularly spaced from reference line 10.

Radially-Coherent Reading

Data is read from a magnetic disk in "radially-coherent" manner in a range of radial positions, if for each radial position in that range, the read-back signal from a magnetic head starts from the moments in time when the head flies by the same radially-extending reference line on the magnetic disk. The technique of radially-coherent reading can be applied to the reading of either radially-coherent or non-radially-coherent written data.

FIG. 3 illustrates radially-coherent reading for radially-coherent written data. For each of written tracks 31-35, corresponding read-back signals 51-55 from a magnetic head are shown. For better demonstration of alignment, the read-back signals are shown superposed with the media magnetization. The radially-coherent reading for each radial position 31-35 on the respective data tracks always starts from the same radial reference line 10.

The ability to write radially-coherent data, and read it back in radially-coherent manner, is important for testing of magnetic heads and magnetic disks.

PRIOR ART

In the manufacturing of disk-based storage systems, known as a "disk-drives", magnetic heads are usually tested on systems known as magnetic head/disk testers with regard to their parameters and performance characteristics. An example of a prior art head/disk tester 100 is in FIG. 4, showing a schematic block diagram of the tester. In that figure, head/disk tester 100 consists of spinstand 110, preamplifier 120, read-write analyzer 130, spinstand controller 140, and computer system 150. The illustrated prior art head/disk tester 100 is similar to the Model V2002 Spinstand used in conjunction with the Model 4000 Read-Write Analyzer, both produced by Guzik Technical Enterprises, Mountain View, Calif.

In use, a magnetic disk 111 is mounted on a rotating spindle 114 (and associated drive motor) equipped with an optical encoder to denote the angular position of the spindle. A magnetic head assembly 112 is mounted on a head positioner mechanism 113, which the head assembly 112 on the disk 111 to position the read and write elements of the head assembly opposite a desired location of the disk 112. Either the magnetic disk 111 on spindle 114, or the magnetic head assembly 112, and an included head reading element and a head writing element, could be "under test" by the head/disk tester 100 at a given time.

The head assembly 112 has electrical connection to a preamplifier 120, which supplies a Write signal 121 to the head writing element of head assembly 112 (pursuant to a write operation), and receives a Read-back signal 122 from the head reading element of head assembly 112 (pursuant to a read operation).

The preamplifier 120 is connected to the read-write analyzer 130. Read-write analyzer 130 generates the Write signal 121 by means of a Write Channel 131—and thereby provides writing functionality for read-write analyzer 130. Read-write analyzer 130 also performs the analysis of the Read-back signal 122 by means of a Read Channel 134—and thereby provides reading functionality for read-write analyzer 130.

In order to synchronize the data reading and data writing with the disk rotation, the optical encoder of spindle 114 generates an Index signal 115A and an Encoder signal 115B. Those signals are synchronous with the rotation of spindle 114. In the illustrated form, the Index signal 115A is generated once per spindle revolution, while Encoder signal 115B is generated multiple times over each spindle revolution, denoting regular angular movements of the spindle, while the spindle rotates at a nominally constant angular rate during normal operation.

Index signal 115A and Encoder signal 115B are supplied to a timebase generator 132 of the read-write analyzer 130. The timebase generator 132 generates synchronization signals including a Write Gate signal 133 for the Write Channel 131 and a Read Gate signal 330 for the Read Channel 134, to synchronize their operation with the spindle rotation and therefore with the rotation of magnetic disk 111.

Write Channel 131 produces a write data signal, which is a sequence of data bits generated synchronously with a bitcell clock. Write Channel 131 starts the write data generation in response to a received Write Gate signal 133, generated by the timebase generator 132, which is synchronized with the spindle Index and Encoder signals.

Spindle Index signal 115A, though generated synchronously with the spindle rotation, nevertheless has a random jitter with respect to the index radial line (or "axis") 10—the "imaginary" radially-extending reference line on the magnetic disk 111 which corresponds to an index location on the magnetic disk. The index jitter can be defined as a standard deviation of the time difference between the moment in time when the rising edge of the Index signal appears and the moment in time when the index radial line 10 flies by the head writing element of head assembly 112. Non-zero jitter means that this time difference varies from revolution to revolution. This jitter is caused by mechanical properties of the spindle and electrical properties of the spindle encoder. On modern head/disk testers, the index jitter is typically on the order of several nanoseconds.

Because the Write Gate signal is synchronized with the Index signal (and the corresponding index location on the spindle, and thus the magnetic disk 111), the jitter of the Write Gate signal with respect to the index radial line 10, has similar or a larger value than the Index jitter. Since the write data (as detected on disk 111) is synchronized with the Write Gate signal, the Write Data jitter with respect to the location on the disk 111, is similar.

On the other hand, modern disk data densities approach sub-nanosecond bitcell clock periods, and the index/encoder jitter, and therefore the write data jitter, are greater than the bitcell clock period duration (typically, as short as 0.5 nanoseconds). As a consequence, any two write operations would write the corresponding data at different locations on the magnetic disk, where, in practice, the maximum shift can reach tens of nanoseconds.

This severely limits the radially-coherent writing capabilities of conventional-type head/disk testers, such as that shown in FIG. 4, which employs the above described spindle optical encoder synchronization method. The prior art head/disk testers are too imprecise for modern heads and data densities.

Similar considerations apply to the radially-coherent reading.

To improve the radially-coherent reading and writing capabilities of conventional-type head/disk testers, the above-described spindle optical encoder synchronization method is supplemented by a prior art synchronization method which uses read-back signals coming from servo data pre-written on the magnetic disk itself. This allows exclusion of the imperfections of the spindle and the optical encoder, and significantly reduces the read/write data jitter. Thus, one way to perform such synchronization is to use radially-coherent data, which is already written, i.e., pre-written, on a disk.

Traditionally such radially-coherent data is pre-written on a magnetic disk using either servo track writers (for example, see WIPO Publication No. WO 2001/052260 A1 "Servo track writing using extended copying with head offset" and U.S. Pat. No. 5,796,541 A "Servo track writing measurement of gapped initial clock track to write full clock track"), or by in-drive self-servo writing (for example, see U.S. Pat. No. 7,688,539 B1 "Disk drive self servo writing spiral tracks by propagating bursts" and US Patent Application Publication No. 2013/0033783 A1 "Multi-directional self servo-writing for a disk drive").

The drawbacks of such servo writer methods are:
1. Usage of required expensive servo writing equipment; and
2. Following pre-writing of the radially-coherent servo data on the disk, it is necessary to transfer the magnetic disk from the servo writer equipment to a head/disk tester.

A further drawback of above-described the two-step self-servo writing, is that the disk drive needs to be disassembled in order to remove the servo written disk from the disk drive in order to put it on a head/disk tester.

SUMMARY

Objects of the Invention

It is an object of the present technology, in a form, to provide a head/disk tester that can perform radially-coherent reading from, and writing to, a magnetic disk which does not have any radially-coherent data previously written on it.

Another object of the technology, in a form, is to provide a method of signal synchronization, which allows such radially-coherent reading and writing, and does not depend on, or require, any radially-coherent data previously written on the magnetic disk The present technology provides a method and system for selectively writing data to two or more concentric circular data tracks on a magnetic disk in a radially-coherent manner, and selectively reading the data from such data tracks on the disk, without requiring coherent information to be pre-written on the data tracks of the disk. To effect such radially-coherent writing, a non-coherent synchronization magnetization pattern is written by a magnetic write head to an area of the disk spanning the data tracks as a part of the writing, followed by writing of data to the data tracks. The synchronization magnetization pattern includes a first portion and a second portion along the data tracks, positioned to pass the magnetic write head in sequence along the tracks as the disk rotates past the write head.

The first portion of the synchronization magnetization pattern includes (i) a succession of regions of a first magnetization interspersed with regions of a second magnetization extending along each of a first set of alternate ones of the data tracks, and (ii) an uninterrupted region of the first, or the second magnetization, or demagnetized, extending along each of a second set of alternate ones of the data tracks which are interspersed with the first set.

The second portion of the synchronization magnetization pattern includes (i) a succession of regions of the first magnetization interspersed with regions of the second magnetization extending along each of a first set of alternate ones of the data tracks, and (ii) an uninterrupted region of the first, or second magnetization, or demagnetized, extending along each of a second set of alternate ones of the data tracks which are interspersed with the first set.

The uninterrupted regions of the first portion are contiguous with respective ones of the succession of regions of differing magnetization of the second portion, and the uninterrupted regions of the second portion are contiguous with respective ones of the succession of regions of differing magnetization of the first portion.

Further, the interspersed regions of magnetization of the succession of each of the first portion and the second portion are characterized by:
(i) substantially no spatial correlation of interbit boundaries along the respective data tracks with the interspersed regions of magnetization of the succession of the same portion, and (ii) substantially no spatial correlation of interbit boundaries along the respective data tracks with the interspersed regions of magnetization of the succession of the other portion.

In a form, a system includes a head/disk tester adapted to perform selective radially-coherent reading from, and writing to, a magnetic disk without pre-written servo information where the system includes a spinstand, a spinstand controller, a preamplifier, a read-write analyzer, and a computer system for overall control of the various elements of the head/disk tester system. In a form, the various elements can be similar to conventional elements, but the read/write analyzer is adapted to perform the radially-coherent writing to, and reading from, the magnetic disk in accordance with the invention. In a form, a synchronizer is included in the read/write analyzer, which effects the radially-coherent writing to, and reading from, the magnetic disk.

BRIEF DESCRIPTION OF THE DRAWINGS

FIG. 1 shows in plan view, a magnetic disk with data written thereon in a radially-coherent manner;

FIG. 2 shows in plan view, a magnetic disk with data written thereon in a non-radially-coherent manner;

FIG. 3 shows waveforms of radially-coherent data read from the magnetic disk of FIG. 1;

FIG. 4 shows in block diagram form, an exemplary prior art head/disk tester system, including a spinstand, a spinstand controller, a preamplifier, a read-write analyzer and a computer system for overall control of the various elements of the head/disk tester system;

FIG. 5 shows in plan view, a magnetic disk formatted with synchronization areas for radially-coherent reading and writing;

FIG. 6 shows in block diagram form, an exemplary embodiment of a head/disk tester adapted for performing radially-coherent reading from, and writing to, a magnetic disk without pre-written servo information, including a spinstand, a spinstand controller, a preamplifier, a read-write analyzer for performing radially-coherent reading from, and writing to, a magnetic disk in accordance with the invention, and a computer system for overall control of the various elements of the head/disk tester system;

FIG. 7 shows (i) magnetic head read element positions with respect to data tracks while reading signals written in a synchronization area of a disk, and (ii) exemplary waveforms of read-back signals detected from the synchronization area, for six radial positions equally spaced over two radially successive tracks on a disk;

FIG. 8 shows in block diagram form, an exemplary synchronizer for the read/write analyzer of the system of FIG. 6;

FIG. 9 shows a schematic representation of a read-back signal acquired from a single sector and illustrates the operation of the memory units of the synchronizer of the read/write analyzer of the system of FIG. 6;

FIG. 10 illustrates the optimal shift for delivering maximum correlation between signals captured on adjacent radial positions;

FIG. 11 illustrates the process of computing the accumulated shift for four adjacent radial positions; and FIG. 12 illustrates the generation of a synchronization strobe by a synchronization strobe generator to provide radially-coherent synchronization for the Read Channel or Write Channel of the read/write analyzer of FIG. 6.

DETAILED DESCRIPTION

Radially-coherent reading and writing processes include two stages:

1. writing to a synchronization area of a magnetic disk with a structure in the manner described in the below Synchronization Area section, and
2. executing the radially-coherent reading or writing operations, synchronized by a read-back signal from the synchronization area of the magnetic disk.

Radially-coherent data on a magnetic disk can be read using conventional head/disk testers, such as head/disk tester 100 shown in FIG. 4, or by head/disk testers of the invention, such as head/disk tester 100A shown in FIG. 6 described below, as well as other systems and methods within the scope of the claims.

An exemplary magnetic disk 111A formatted with synchronization areas for radially-coherent reading and writing, is shown in FIG. 5.

An exemplary embodiment of a head/disk tester 100A adapted for performing radially-coherent reading from, and writing to, a magnetic disk 111, without requiring pre-written servo information, is shown in FIG. 6. Head/disk tester 100A includes spinstand 110, preamplifier 120, a read-write analyzer 130A for performing radially-coherent reading, spinstand controller 140, and computer system 150. In FIG. 4 and FIG. 6, elements with like reference numbers function in a similar manner.

The magnetic disk 111A of FIG. 5, and the head/disk tester system 100A of FIG. 6, present an exemplary embodiment of a system of the invention, which performs the method of the invention. Other methods and systems which are structured within the scope of the claims, and which perform the method defined by the claims, may be used as well.

Synchronization Area

FIG. 5 shows a magnetic disk 111A which includes sixteen "pie-shaped" sectors (having boundaries denoted by radially-extending dotted lines) disposed about a rotation axis RA. One such sector is denoted by reference numeral 210. The magnetic disk 200 also includes a plurality of concentric (about rotation axis RA) circular data tracks on one or both major surfaces of the disk. A group of eleven mutually adjacent data tracks is denoted by shaded area 220 in FIG. 5.

The radial width and radial position of the synchronization areas are selected so that the synchronization areas span all tracks on the magnetic disk which are intended for radially-coherent reading or writing. The data tracks 220 include synchronization areas such as synchronization area 230 at a "lead" edge of the sectors on the disk (where "lead" refers to the region adjacent to the sector's boundary which passes the head assembly 112 first as the disk rotates about the spindle axis in use).

The format of the synchronization area 230 for sector 210 and data tracks 220 is shown in exploded form in FIG. 5. The synchronization area consists of two parts: a First (or leading) Part 241 and a Second (or trailing) Part 242.

In the exemplary format of FIG. 5, the odd-numbered tracks (counting from the disk perimeter) in First Part 241 are written with a first digital signal 250, while the even-numbered tracks First Part 241 are erased (to contain all 1's, or all 0's, or demagnetized). The even-numbered tracks (counting from the disk perimeter) in Second Part 242 are written with a second digital signal 251, while the odd-numbered tracks of Second Part 242 are erased (to contain all 1's, or all 0's, matching magnetization of the even-numbered tracks in signal 250, or demagnetized).

The format of the pair of signals 250 and 251 is selected so that the bit patterns of each of those signals has no correlation with any part of itself, and has no correlation with any part of the other signal in the pair.

One example of such a pair of signals, is a down-chirp signal for the signal 250 and an up-chirp signal for the signal 251, in a checkerboard pattern, such as shown in FIG. 5. For the purposes of disk 111A, a "chirp" signal is a digital signal in which the instantaneous bit-to-bit frequency increases from the lead edge ("up-chirp") or decreases from the lead edge ("down-chirp") with time.

Because the above-noted "no correlation" bit pattern restrictions do not impose strict radial coherency limits on signals 250 and 251, those signals 250 and 251 can be written to the synchronization area using a conventional head/disk tester, such as head/disk tester 100 shown in FIG. 4 with a spindle optical encoder synchronization method similar to conventional signal writing on such testers. The ability to write to the synchronization area with a conventional head/disk tester, or corresponding devices (as opposed to requiring expensive servo-writing equipment for pre-writing, followed by transfer of the magnetic disk from the servo-writing equipment to a head/disk tester, as in the prior art), is a principal advantage of the method and system of the invention.

The signals on different tracks of the synchronization area have poor radial coherency, caused by the index jitter, when the above-described conventional spindle optical encoder synchronization method is used for writing to the synchronization areas.

FIG. 7 shows (i) magnetic head reading element positions with respect of data tracks while reading signals written in a synchronization area of a disk, and (ii) exemplary waveforms of read-back signals detected from the synchronization area, for six radial positions equally spaced over two radially successive tracks on a disk. Thus, FIG. 7 shows how the read-back signal appears when the magnetic head reads different parts of the synchronization area.

In particular, FIG. 7 shows exemplary waveforms of read-back signals detected from a synchronization area 230 for six radial positions equally spaced over two radially successive tracks on disk 111A. The left side of FIG. 7 shows the position of the magnetic head reading element with respect to the two data tracks of synchronization area 230. The right side of FIG. 7 shows the read-back signal which corresponds to the magnetic head position shown to the left. Six radial positions are shown (711-716):

1. For track 711, when the reading element is positioned directly above one of the written tracks in First Part 241 of the synchronization area 230: the read-back signal from First Part 241 has 100% strength, while there is no signal from Second Part 242, since the read element is aligned with the fully erased track;
2. For track 712, when the reading element is moved away from the track by 20% of track width, so the head observes only 80% of the track: the read-back signal has 80% strength for First Part 241 and 20% for Second Part 242;
3. For track 713, when the read element is moved by 40% of track width: 60% strength for First Part 241 and 40% for Second Part 242;
4. For track 714, when the read element is moved away from the track by 60% of track width: 40% strength for First Part 241 and 60% for Second Part 242;
5. For track 715, when the read element is moved away from the track by 80% of track width: 20% strength for First Part 241 and 80% for Second Part 242; and
6. For track 716, when the read element is moved away from the track by 100% of track width, so it is positioned directly above one of the written tracks in Second Part 242 of the synchronization area: no signal for First Part 241 and 100% for Second Part 242.

Two signals are referred to herein as "well correlated with a given optimal shift", when the correlation of the first signal with the second signal shifted in time by some shift value, reaches its maximum when the shift value is equal to the "optimal shift" value. Consider two read-back signals observed at two adjacent radial positions in the synchronization area 230, so that the radial distance between these two radial positions is less than one half of the track width. Any two consequent read-back signals from FIG. 7 match this definition, for example, the signal pairs 711 and 712, 713 and 714, and 715 and 716. The signals of the respective signal pairs are "well correlated" with each other when properly aligned in time.

The format of the First Part 241 and Second Part 242 signals written to synchronization area 230 guarantees that, at any radial position, only one non-erased track from each part of the synchronization area 230 is observed by the head reading element. Therefore, the aforementioned read-back signals have much in common: in particular, the fragment of the signal with the highest amplitude, which corresponds to the track either from First Part 241, or from Second Part 242, or from both parts of the synchronization area. For example, for the pair of signals 711 and 712 in FIG. 7, such well-correlated fragment is 720, which corresponds to the track from First Part 241. For the pair of signals 713 and 714, such well correlated fragment is 721 which is the whole signal. For the pair of signals 715 and 716, such well-correlated fragment is 722, which corresponds to the track from Second Part 242.

Also, because the signals in the synchronization area 230 are chosen such that each of them has poor correlation with any part of itself, and any part of the other signal in the pair, then there is only one distinctive correlation maximum. Moreover, this correlation maximum is attained only when two signals are aligned in a radially-coherent manner.

Head/Disk Tester for Radially-Coherent Operations

FIG. 6 shows a block diagram of a head/disk tester which in part, is similar to those of the prior art. Importantly, the read-write analyzer portion of the tester of FIG. 6, differs from the prior art, so that it effects performance of radially-coherent reading and writing using the aforementioned synchronization areas shown in FIG. 5. The difference of the head/disk tester 100A shown in FIG. 6 from prior-art head/disk testers, and particularly head/disk tester 100 of FIG. 4, lies within the implementation of Synchronizer 320.

Synchronizer 320 of tester 100A receives the read-back signal 311, analyzes that signal, and generates a Synchronization Strobe 321. Synchronization Strobe 321 is generated at least once per sector, and that strobe is synchronized with the read-back signal 311 coming from the magnetic disk 111A.

Synchronizer 320 receives a Sector Strobe 331 from Timebase Generator 132. The Sector Strobe 331 is generated from Spindle Index signal 115A and Encoder signal 115B at the beginning (relative to a radially-extending reference line 10) of each sector. Synchronization Strobe 321 is supplied to the timebase generator 132. Timebase generator 132 uses Synchronization Strobe 321 instead of Spindle Index signal 115A and Encoder signal 115B to synchronize timebase signals such as Write Gate signal 133 and Read Gate signal 330 with the read-back signal 311 coming from the head reading element of head assembly 112.

The Write Gate signal 133 is used to synchronize the Write Channel 131, and the Read Gate signal 330 is used to synchronize the Read Channel 134, with the with the read-back signal 311 coming from the head reading element of head assembly 112.

This method of synchronization with the read-back signal, significantly reduces the Synchronization Strobe jitter with respect to the spindle index jitter.

Synchronization Sequence

Radially-coherent reading or writing is performed the following way:
1. The magnetic head assembly 112 is positioned on the first radial position intended for radially-coherent operations. This radial position is inside the synchronization area 230 for a sector of the associated data track;
2. For each sector, the read-back signal from the synchronization area 230 is captured by Synchronizer 320;
3. The magnetic head assembly 112 is moved to the next adjacent radial position intended for radially-coherent operations. For reliable Synchronizer 320 operation, the radial difference between the two adjacent radial positions must be less than one-half of the track width;
4. For each sector, the read-back signal from the synchronization area 230 is captured and analyzed by the Synchronizer 320;
5. The Synchronizer 320 generates the Synchronization Strobes (one for each sector), which are used to initiate either read or write operations synchronously with the read-back signal; and
6. When the read or write operation is finished, the head assembly 112 is moved to the next adjacent radial position within the radial boundaries of synchronization area 230 and steps 4 and 5 are repeated.

Synchronizer

FIG. 8 shows a block diagram of an exemplary implementation of Synchronizer 320. Synchronizer 320 includes an analog-to-digital converter (ADC) 410, Acquisition Control 411, two memory modules to store digitized signals (Memory Unit 1 (420) and Memory Unit 2 (430)), Shift Detector 440, Shift Accumulator 450, and Synchronization Strobe Generator 460.

For each radial position intended for radially-coherent operation, the read-back signal 311, similar to ones shown in FIG. 7, is digitized by the ADC 410 and the digitized data is transferred to the Memory Unit 1 (420).

Acquisition Control 411 controls the process of digitized data samples acquisition and storing the digitized data in the Memory Unit 1 (420). Before the digitized data is acquired into Memory Unit 1, the whole content of the Memory Unit 1 (420) is transferred into the Memory Unit 2 (430), so that Memory Unit 2 contains the digitized data acquired at the previous radial position.

Acquisition Control 411 starts acquisition of the read-back data, synchronized by Sector Strobe 331. In a form, acquisition starts directly from Sector Strobe 331; however, in some embodiments, acquisition starts from a signal derived from Sector Strobe 331.

Acquisition Control 411 stores the portion of the read-back signal which belongs to the synchronization area 230 plus some portions of a signal before and after the synchronization area signal. The synchronization area signals for each sector in the revolution are acquired.

FIG. 9 schematically shows the read-back signal acquired from a single sector into the Memory Unit 1 (420): it consists of three parts: the synchronization area signal 520, the portion of a signal before the synchronization area 510, and the portion of a signal after the synchronization area 530. The duration D (in ADC samples) of "before" and "after" portions is selected to be not less than the spindle index jitter, so that for any Sector Strobe position, the whole synchronization area signal will be certainly acquired into the Memory Unit 1. Such digitized data is referred to below as "digitized synchronization signal" or simply the "synchronization signal".

As soon as the digitized synchronization signal for a certain sector is stored in the Memory Unit 1, Shift Detector 440 performs a process of finding an optimal shift of two synchronization signals captured in the same sectors, but on two adjacent radial positions and stored in the Memory Unit 1 and Memory Unit 2, respectively. The shift is "optimal" if it delivers the maximum correlation value computed on two synchronization signals, i.e. when two synchronization signals are well correlated with the aforementioned optimal shift.

The correlation maximum is determined in the following manner (FIG. 9 illustrates the algorithm):
1. The synchronization signal from a given sector captured at the current radial position, is stored in the Memory Unit 1, while the synchronization signal from the same sector which was captured at the previous radial position was stored in the Memory Unit 2;
2. Algorithm variables are initialized: the "correlation running maximum" is set to zero; the "optimal shift" value is reset; the "current shift" value is set equal to D—the number of samples in "before" and "after" signal portions;
3. The synchronization signal from the Memory Unit 1 is shifted left (towards the earlier samples) by the number of samples equal to the current shift value, if shift is positive, or shifted right if shift is negative;
4. The correlation between the overlapping regions of the signal from the Memory Unit 2 and the shifted signal from the Memory Unit 1 is calculated;
5. The correlation value is compared with the running maximum;
6. If the correlation value is greater than the running maximum, the running maximum is updated with the correlation value, and the optimal shift is updated with the current shift; and Steps 3-6 are repeated for each current shift value from plus D to minus D. FIG. 10 illustrates the result of the algorithm when the synchronization signals captured on adjacent radial positions are aligned, to deliver maximum correlation between them. After completion of the algorithm, the Optimal Shift variable contains the shift in ADC samples by which the content of Memory Unit 1 must be shifted with respect to the content of Memory Unit 2, so the correlation between samples stored in Memory Unit 2 and samples stored in Memory Unit 1, and shifted by Optimal Shift, reaches its maximum, i.e. for the optimal shift for those two signals to be well correlated.

As noted above in the Synchronizer Area section, the synchronization area format has the following properties:
1. Because the radial difference between the two adjacent radial positions is chosen to be less than one half of the track width, then two synchronization signals captured at adjacent radial positions can be "well correlated" with each other with a proper alignment (see FIG. 7, 720, 721, 722 and FIGS. 19, 610); and
2. Because the signals in the synchronization area are chosen such that each of them has poor correlation with any part of itself and any part of another signal in the pair, then there will be only one distinctive correlation maximum.

Because of these properties of the synchronization area, the correlation maximum will be achieved only when the synchronization signals captured at adjacent radial positions are aligned in the radially-coherent manner. In other words, the Optimal Shift value shows how two synchronization signals captured at two adjacent radial positions, must be shifted with respect to each other to become radially-coherent, i.e., when two signals from two adjacent offsets are aligned to be well correlated, then they become radially-coherent.

When the Shift Detector 440 finishes the correlation maximum search for a given sector, it outputs the Optimal Shift variable value (441) to the Shift Accumulator 450. The Shift Accumulator 450 adds Optimal Shift value 411 to its internal accumulator and outputs the Accumulated Shift value 451 to the Synchronization Strobe Generator 460. Finally, the Synchronization Strobe Generator 460 generates the Synchronization Strobe 321.

The process of computing the Accumulated Shift is illustrated in FIG. 11 for four adjacent radial positions. The gray rectangles 811, 812, 813, and 814 show the digitized readback signals acquired at those four radial positions for the same sector. The signal 811 is captured for the very first radial position intended for radially-coherent operations. The dashed white regions 821, 822, 826, and 824 show the well correlated fragments of these signals. Thin arrows 832, 833, and 834 show the optimal shift values computed by the Shift Detector 440 when processing pairs of signals (811, 812), (812, 813), and (813, 814). Thick arrows 842, 843, and 844 show the accumulated shift values computed by the Shift Accumulator 450. Each accumulated shift value is computed as a sum of the previous accumulated shift value and the current optimal shift value. For example, Accumulated Shift 2 (843) for the Radial Position 2 (813) is computed as a sum of Accumulated Shift 1 (842) and Optimal Shift 2 (833).

When the signals captured at different radial positions are shifted by the accumulated shift value, they all become aligned in a radially coherent manner with respect to a common reference radial line on a magnetic disk (850).

Radially-Coherent Synchronization

The Synchronization Strobe is generated by the Synchronization Strobe Generator 460, as shown in FIG. 12, to provide radially-coherent synchronization for Read Channel 134 and/or Write Channel 131. The process is shown for two consecutive sectors (it can be easily generalized for arbitrary number of sectors). The X scale 900 is the time scale.

As shown in FIG. 12, two digitized read-back synchronization signals 911 and 912, which are acquired from two synchronization areas in two consecutive sectors on some radial position in a range of radial positions intended for coherent reading/writing. The acquired signals are stored in Memory Unit 1 (420) of Synchronizer 320.

This acquisition in each sector can start, for example, from Sector Strobes (941, 942), which are generated at the beginning of each sector and derived from Spindle Index signal 115A and Encoder signal 115B coming from a spindle. For each acquired synchronization signal (911, 912), Shift Accumulator 450 computes Accumulated Shift values (921, 922).

For moments in time (951, 952) calculated as the sum of the sector acquisition start time (941, 942) and the corresponding Accumulated Shifts (921, 922), those time moments coincide with the time moments when the magnetic head flies by the common reference radii (850) in each sector.

If the generation of read gates, write gates, and write data is synchronized with those time moments (951, 952) in each sector, and on each radial offset, then those gates are synchronized with the signal from the media in a radially coherent manner. Because the operation of the Read Channel 134 or Write Channel 131 is synchronized with the read gates and write gates, respectively, the Read Channel and Write Channel operations are performed in a radially-coherent manner.

A delay T (931, 932) is fixed duration, which is not less than the time required for Shift Detector and Shift Accumulator to complete the calculation of the Accumulated Shift value. Because the Accumulated Shift value becomes available only after delay T from the acquisition start moment (such as 941), Synchronization Strobes (961, 962) are generated only after delays T (931, 932) from the acquisition starts (941, 942). The fixed delay T is added to the Accumulated Shifts to generate the Synchronization Strobes. Synchronization Strobes (961, 962) are then used to start the generation of read or write gates 902.

If the Shift Detector and Shift Accumulator can compute the Accumulated Shift value in real time (T is significantly less than the sector duration), then both radially-coherent writing and reading can occur. Otherwise, if T is bigger than the sector duration, only radially-coherent reading can occur. In the latter case, the Read Channel provides the capability to store the read-back signal in the memory so it will be accessible in a later time, when Accumulated Shift values are finally computed. The Accumulated Shift values are then applied to the stored read-back signal not in a real time. In other embodiments, this post-processing of the read-back signal (digitized in the Read Channel) is performed on a separate computer, not in the read-write analyzer.

One skilled in the art will realize the invention may be embodied in other specific forms without departing from the spirit or essential characteristics thereof. The foregoing embodiments are therefore to be considered in all respects illustrative rather than limiting of the invention described herein. The scope of the invention is thus indicated by the appended claims, rather than by the foregoing description, and all changes that come within the meaning and range of equivalency of the claims are therefore intended to be embraced therein.

What is claimed is:

1. A method for preparing a magnetic disk for storing radially coherent data on a plurality of mutually adjacent, concentric tracks disposed about a disk axis on a major surface of the disk, comprising the steps of:

A. defining a synchronization area and a data area for each of a plurality of circumferentially extending sectors of the tracks, wherein each sector is bounded by a radially extending sync start reference line and a radially extending sync stop reference line, wherein for each sector,
      i. the synchronization area includes a portion of the plurality of tracks extending circumferentially from the start reference line of that sector to a radially extending sync stop reference line of that sector, and
      ii. the data area includes a portion of the plurality of tracks extending circumferentially from the sync stop reference line of that sector to the data stop reference line of that sector,
   B. writing to the synchronization area of each sector on the disk, wherein the writing step comprises the sub-steps of:
      i. defining a pair of sync signals, wherein each sync signal has no correlation with itself, has no correlation with the other sync signal,
      ii. rotating the disk about the disk axis,
      iii. positioning a magnetic write head over a succession of the mutually adjacent tracks, from an innermost or an outermost of the tracks, enabling writing to the respective tracks in response to signals applied to the head,
      iv. during the rotation of the disk, with the write head over a first set of alternate ones of the tracks, applying a first of the pair of sync signals to the write head whereby the first sync signal is written to a first fraction of the synchronization area for each sector, and establishing that a second fraction of the synchronization area for each sector of the first set of tracks is characterized by a magnetization representative of all digital 1's, all digital 0's or is demagnetized, and v. during the rotation of the disk, with the write head over a second set of alternate ones of the tracks, applying a second of the pair of sync signals to the write head whereby the second sync signal is written to a second fraction of the synchronization area for each sector, and establishing that the first fraction of the synchronization area for each sector of the second set of tracks is characterized by a magnetization representative of all digital 1's, all digital 0's or is demagnetized.

2. The method for preparing a magnetic disk of claim 1, wherein the first fractions and second fractions for the respective tracks, are characterized by equal length in a circumferential direction about the disk axis.

3. The method for preparing a magnetic disk of claim 1, wherein one of the pair of sync signals is an up-chirp.

4. The method for preparing a magnetic disk of claim 1, wherein one of the pair of sync signals is a down-chirp.

5. The method for preparing a magnetic disk of claim 1, wherein one of the pair of sync signals is an up-chirp and the other of the pair is a down-chirp.

6. A magnetic disk for storing radially coherent data on a plurality of mutually adjacent, concentric tracks disposed about a disk axis on a major surface of the disk, comprising:
   on a major surface of the disk, a synchronization area and a data area overlying each of a plurality of circumferentially extending sectors of the tracks, wherein each sector is bounded by a radially extending sync start reference line and a radially extending sync stop reference line, wherein for each sector,
   i. the synchronization area overlies a portion of the plurality of tracks extending circumferentially from the start reference line of that sector to a radially extending sync stop reference line of that sector, and
   ii. the data area overlies a portion of the plurality of tracks extending circumferentially from the sync stop reference line of that sector to the data stop reference line of that sector,
   wherein, on a first set of alternate ones of the tracks, a first of a pair of sync signals is written to a first fraction of the synchronization area for each sector, and a second fraction of the synchronization area for each sector of the first set of tracks is characterized by a magnetization representative of all digital 1's, all digital 0's or is demagnetized, and
   wherein, on a second set of alternate ones of the tracks, a second of the pair of sync signals is written to a second fraction of the synchronization area for each sector, and a first fraction of the synchronization area for each sector of the second set of tracks is characterized by a magnetization representative of all digital 1's, all digital 0's or is demagnetized, and
   wherein each sync signal of the pair of sync signals, has no correlation with itself and no correlation with the other sync signal.

7. A magnetic disk according to claim 6, wherein the first fractions and second fractions for the respective tracks, are characterized by equal length in a circumferential direction about the disk axis.

8. A magnetic disk according to claim 6, wherein one of the pair of sync signals is an up-chirp.

9. A magnetic disk according to claim 6, wherein one of the pair of sync signals is a down-chirp.

10. A magnetic disk according to claim 6, wherein one of the pair of sync signals is an up-chirp and the other of the pair is a down-chirp.

11. A method for processing a magnetic disk having thereon, a plurality of mutually adjacent, concentric tracks disposed about a disk axis on a major surface of the disk, wherein adjacent tracks of the plurality of tracks, are characterized by a same inter-track pitch, comprising the steps of:
   A. providing a magnetic disk having a synchronization area and a data area overlying each of a plurality of circumferentially extending sectors of the tracks, wherein each sector is bounded by a radially extending sync start reference axis and a radially extending sync stop reference axis, wherein for each sector,
      i. the synchronization area includes a portion of the plurality of tracks extending circumferentially from the start reference axis of that sector to a radially extending sync stop reference axis of that sector, and
      ii. the data area includes a portion of the plurality of tracks extending circumferentially from the sync stop reference axis of that sector to the data stop reference axis of that sector,
   wherein, on a first set of alternate ones of the tracks, a first of a pair of sync signals is written to a first fraction of the synchronization area for each sector, and a second fraction of the synchronization area for each sector of the first set of tracks is characterized by a magnetization representative of all digital 1's, all digital 0's or is demagnetized, and
   wherein, on a second set of alternate ones of the tracks, a second of the pair of sync signals is written to a second fraction of the synchronization area for each sector, and a first fraction of the synchronization area for each sector of the second set of tracks is characterized by a magnetization representative of all digital 1's, all digital 0's or is demagnetized, and
   wherein each sync signal of the pair of sync signals, has no correlation
   B. rotating the disk about the disk axis,
   C. positioning a magnetic read head to overlie a first track at a first radial position,
   D. for each sector along the first track, generating a sector strobe representative of the time at which a lead portion of the sector passes the read head,
   E. for each sector along the first track, reading the magnetization along the track during one revolution of the disk,
   F. for each sector along the first track, storing the read magnetization from the synchronization area of the track in a first memory,
   G. for the first radial position, for each sector along the first track, generating a start synchronization strobe representative of a predetermined sync strobe time-delay value,
   H. for the first radial position, for each sector along the first track, transferring the stored read magnetization from the first memory to a second memory,
   I. storing the then-current sync strobe time shift value in a sync strobe register,
   J. radially re-positioning the magnetic read head by less than one-half the inter-track pitch to a new radial position overlying in part an adjacent track of the synchronization area,
   K. for each sector along the then-current radial position, reading the magnetization along the then-current radial position during one revolution of the disk, L. for each sector along the then-current radial position, storing the read magnetization from the synchronization area of the then-current radial position in the first memory, M. for the then-current radial position, for each sector along the then-current radial position, generating a time shift value representative of the time difference between the then-current value stored for that sector in the first memory and the then-current value stored for that sector in the second memory, N. for the then-current radial position, for each sector along the then-current radial position, incrementing the time shift value stored in the register by a new time shift value representative of the time shift of the time shift value stored in the first memory for the then-current radial position, with respect to the time shift value for that sector stored for the next-previous radial position in the second memory, to thereby form an accumulated time shift value stored in the register, and O. generating a synchronization strobe characterized by a delay in relation to the sector strobe that equals to the sum of the then-current accumulated time shift value stored in the register and a predetermined time interval value, and P. repeating steps I-O until reaching a last track in the synchronization area.

12. The method for processing a magnetic disk according to claim 11, wherein one of the pair of sync signals is an up-chirp.

13. The method for processing a magnetic disk according to claim 11, wherein one of the pair of sync signals is a down-chirp.

14. The method for processing a magnetic disk according to claim 11, wherein one of the pair of sync signals is an up-chirp and the other of the pair is a down-chirp.

15. The method for processing a magnetic disk according to claim 11, comprising the further step of:
following step P, using a magnetic write head, positioning the write head to a radial position overlying one of the tracks in the synchronization area, and applying thereto, write signals in synchronism with the then-current synchronization strobe, to thereby effect radially coherent writing to the synchronization area of the magnetic disk.

16. The method for processing a magnetic disk according to claim 11, comprising the further step of:
following step P, positioning the magnetic read head to a radial position overlying one of the tracks in the synchronization area, and detecting magnetization along the track in synchronism with the then-current synchronization strobe, to thereby effect radially coherent reading from the synchronization area of the magnetic disk.

* * * * *